Sept. 5, 1939.  J. G. BEAVER  2,171,737
METHOD OF MAKING TALLY TASSELS
Filed April 2, 1935  7 Sheets-Sheet 1
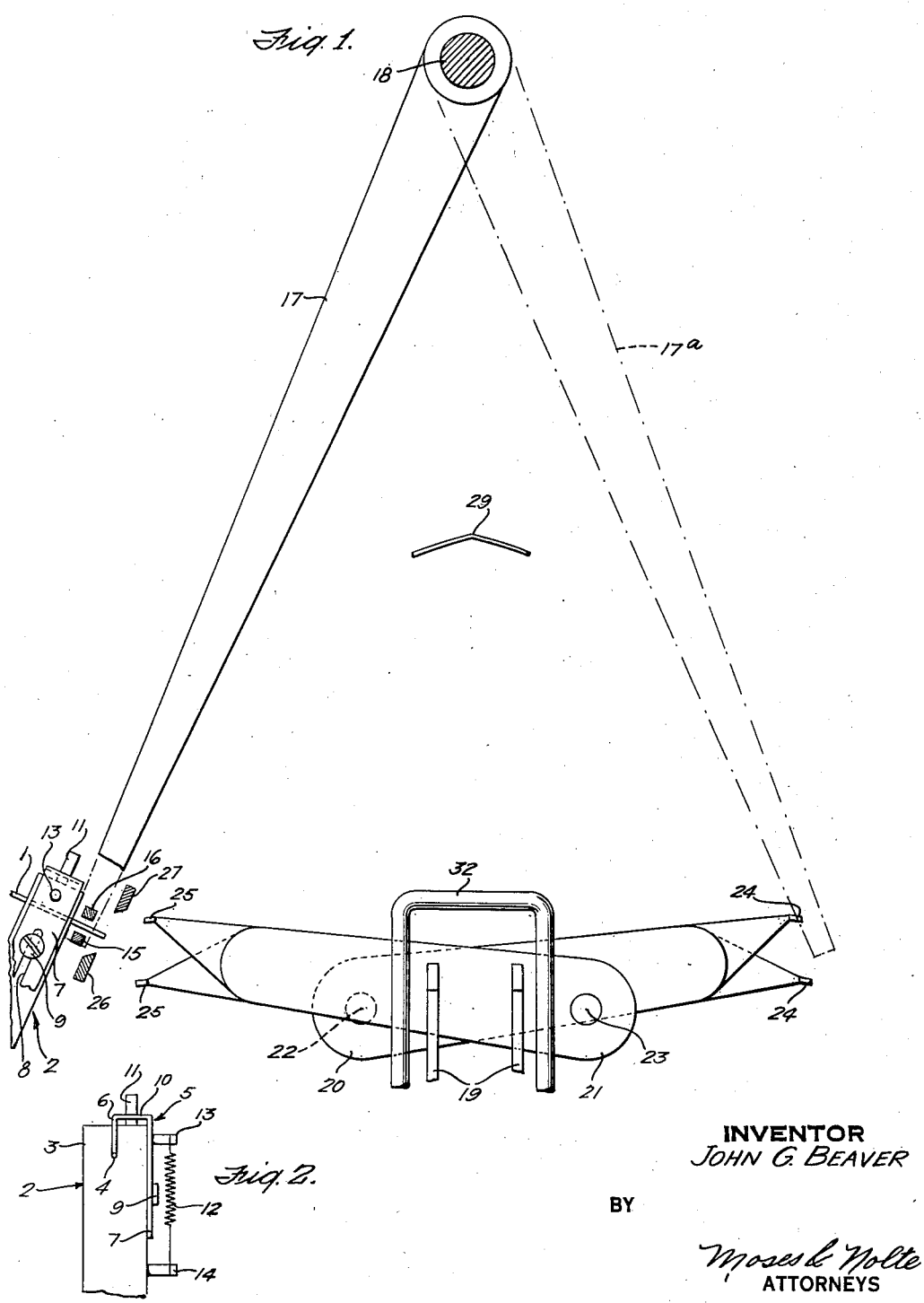
INVENTOR
JOHN G. BEAVER
BY
Moses & Nolte
ATTORNEYS Sept. 5, 1939.  J. G. BEAVER  2,171,737
METHOD OF MAKING TALLY TASSELS
Filed April 2, 1935  7 Sheets-Sheet 2
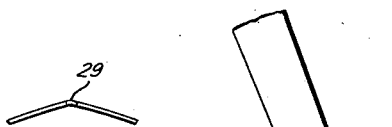
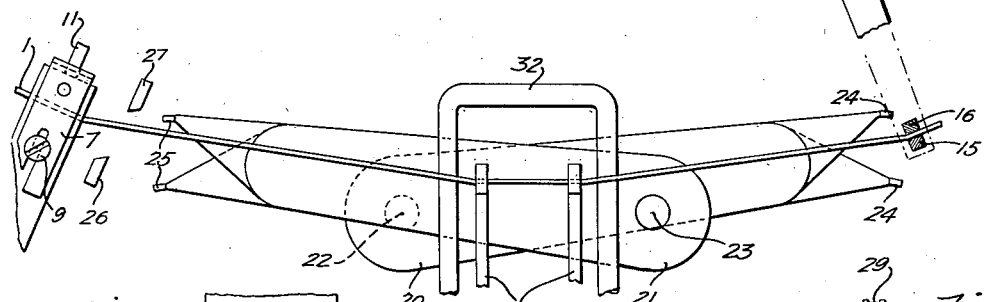
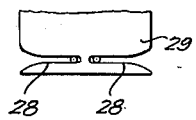
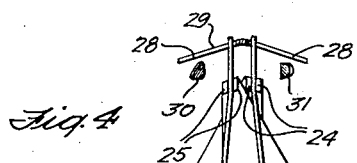
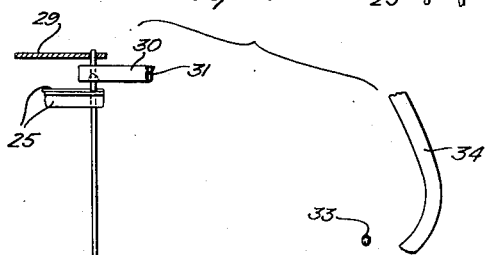
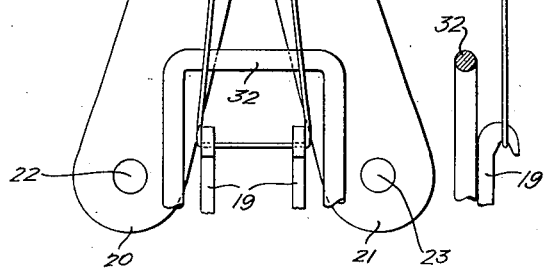
INVENTOR
JOHN G. BEAVER
BY
Moses & Nolte
ATTORNEYS Sept. 5, 1939.  J. G. BEAVER  2,171,737
METHOD OF MAKING TALLY TASSELS
Filed April 2, 1935  7 Sheets-Sheet 3
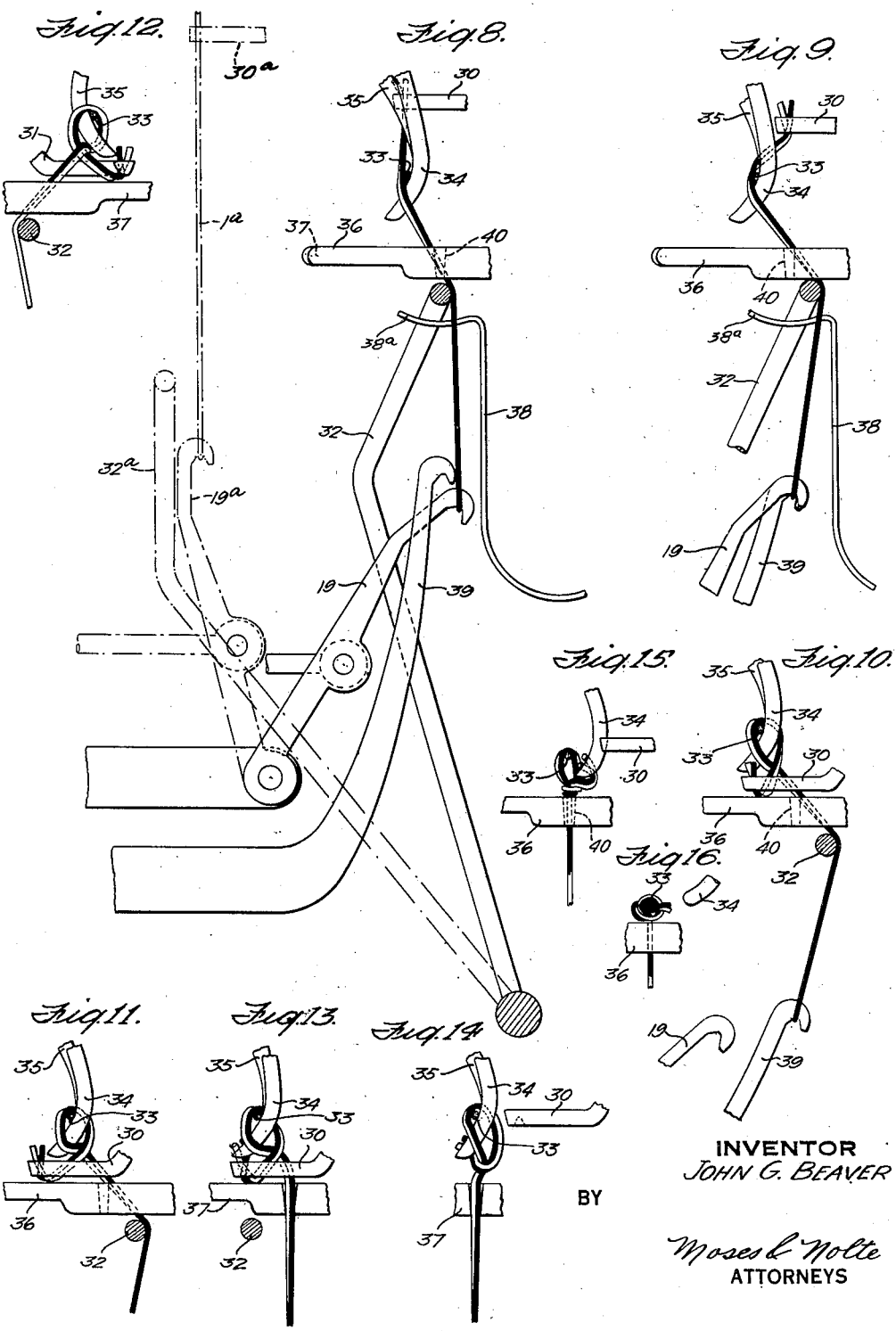
INVENTOR
JOHN G. BEAVER
BY Moses & Nolte
ATTORNEYS

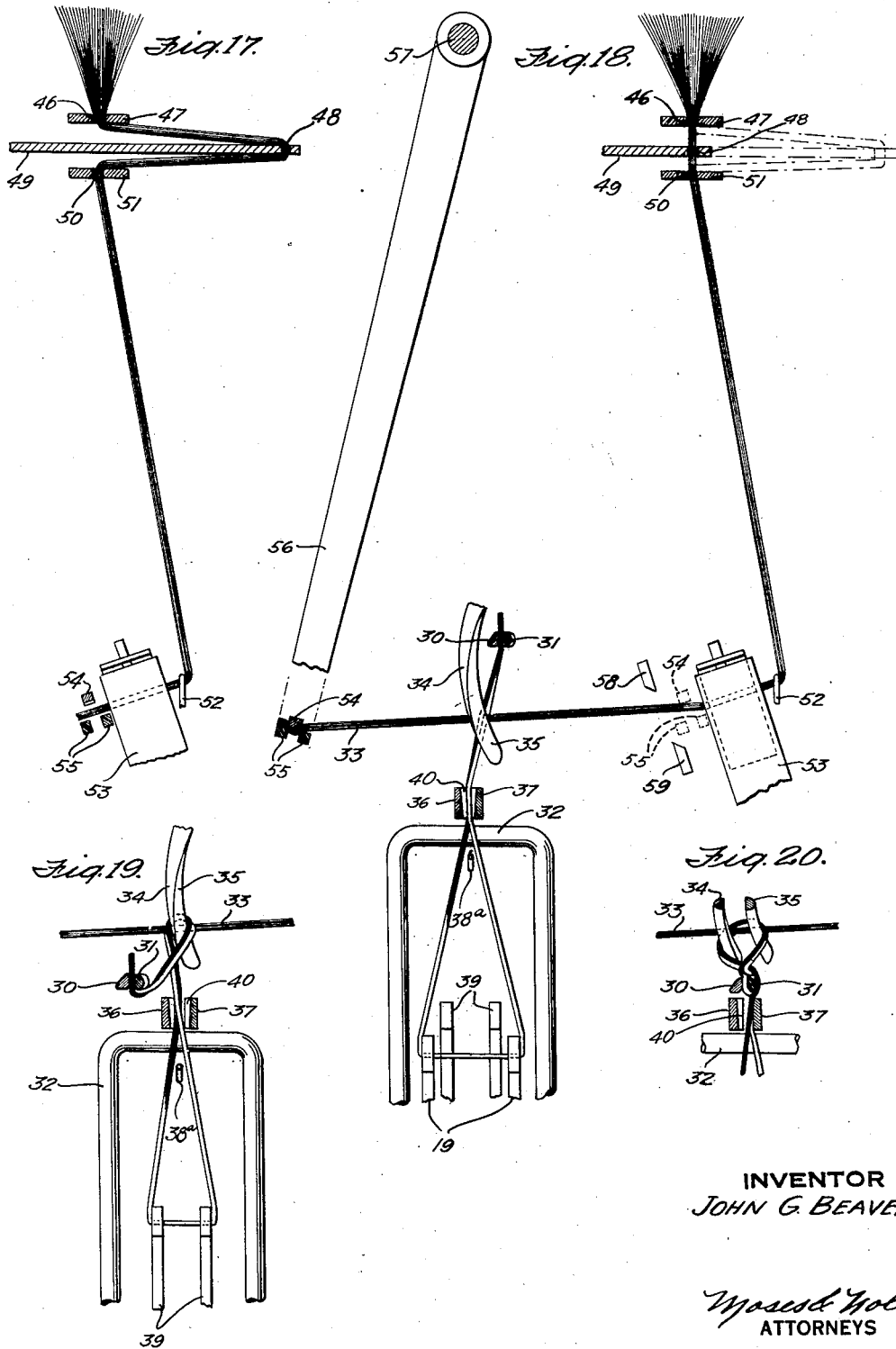

Sept. 5, 1939.  J. G. BEAVER  2,171,737
METHOD OF MAKING TALLY TASSELS
Filed April 2, 1935  7 Sheets-Sheet 5
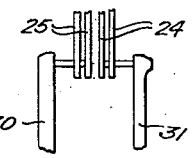
Fig. 21.
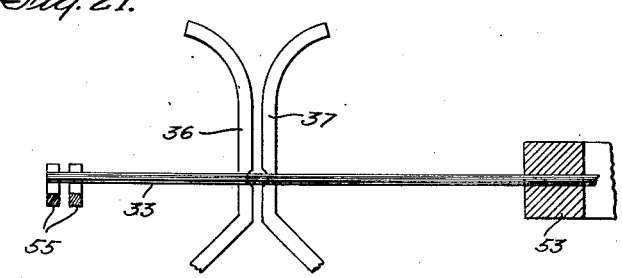
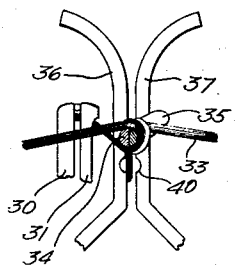
Fig. 23.
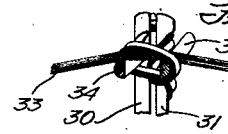
Fig. 24.
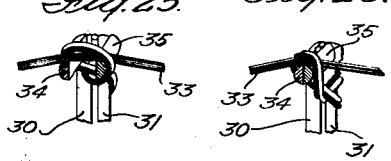
Fig. 25.  Fig. 26.
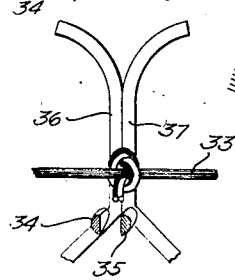
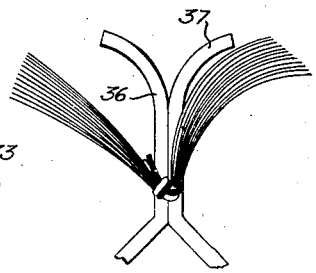
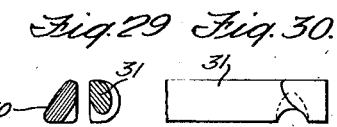
Fig. 29  Fig. 30.
Fig. 27.  Fig. 28.
INVENTOR
JOHN G. BEAVER.
BY
Moses & Nolte
ATTORNEYS Sept. 5, 1939. J. G. BEAVER 2,171,737
METHOD OF MAKING TALLY TASSELS
Filed April 2, 1935 7 Sheets-Sheet 6
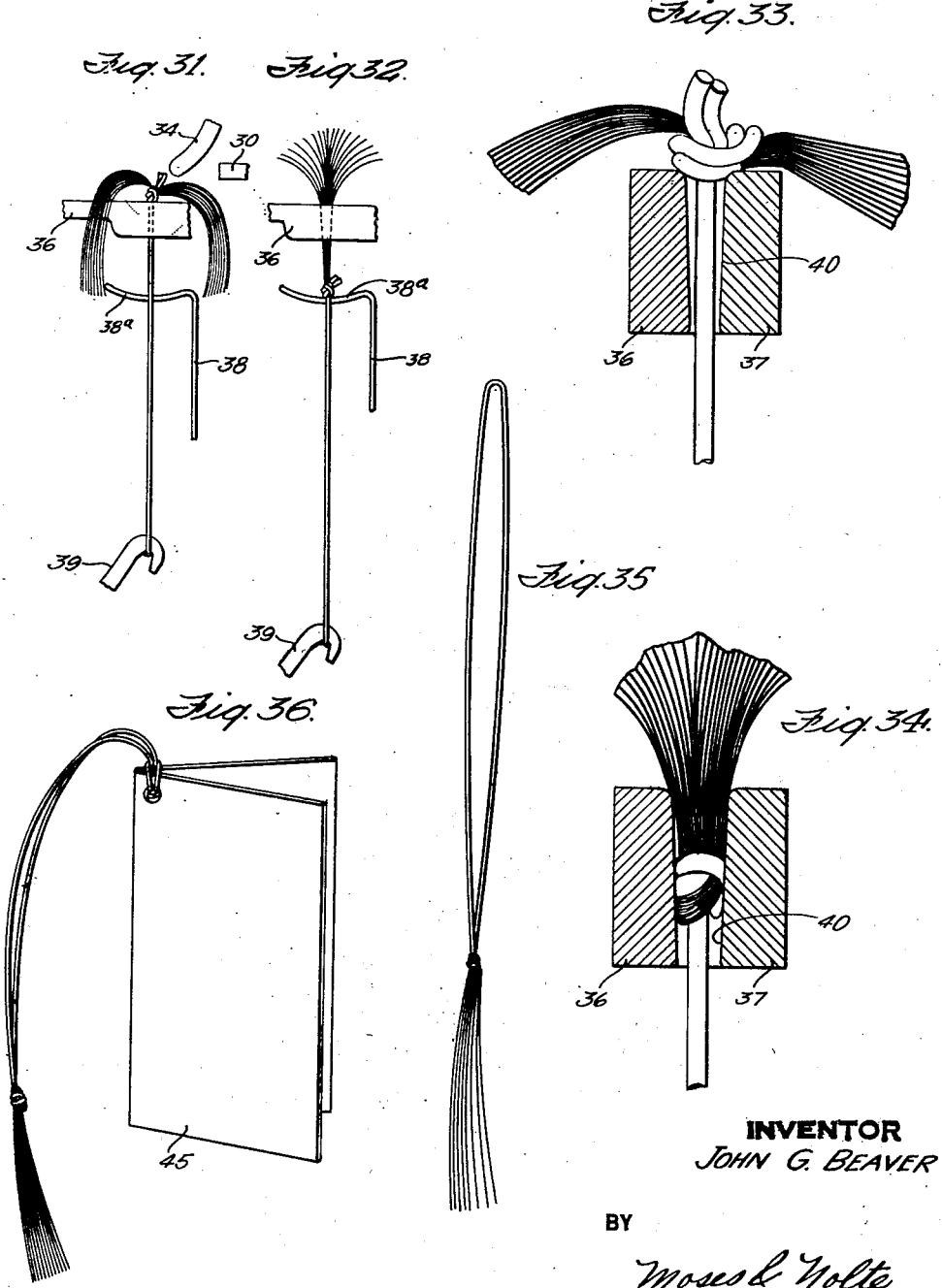
INVENTOR
JOHN G. BEAVER
BY
Moses & Nolte
ATTORNEYS

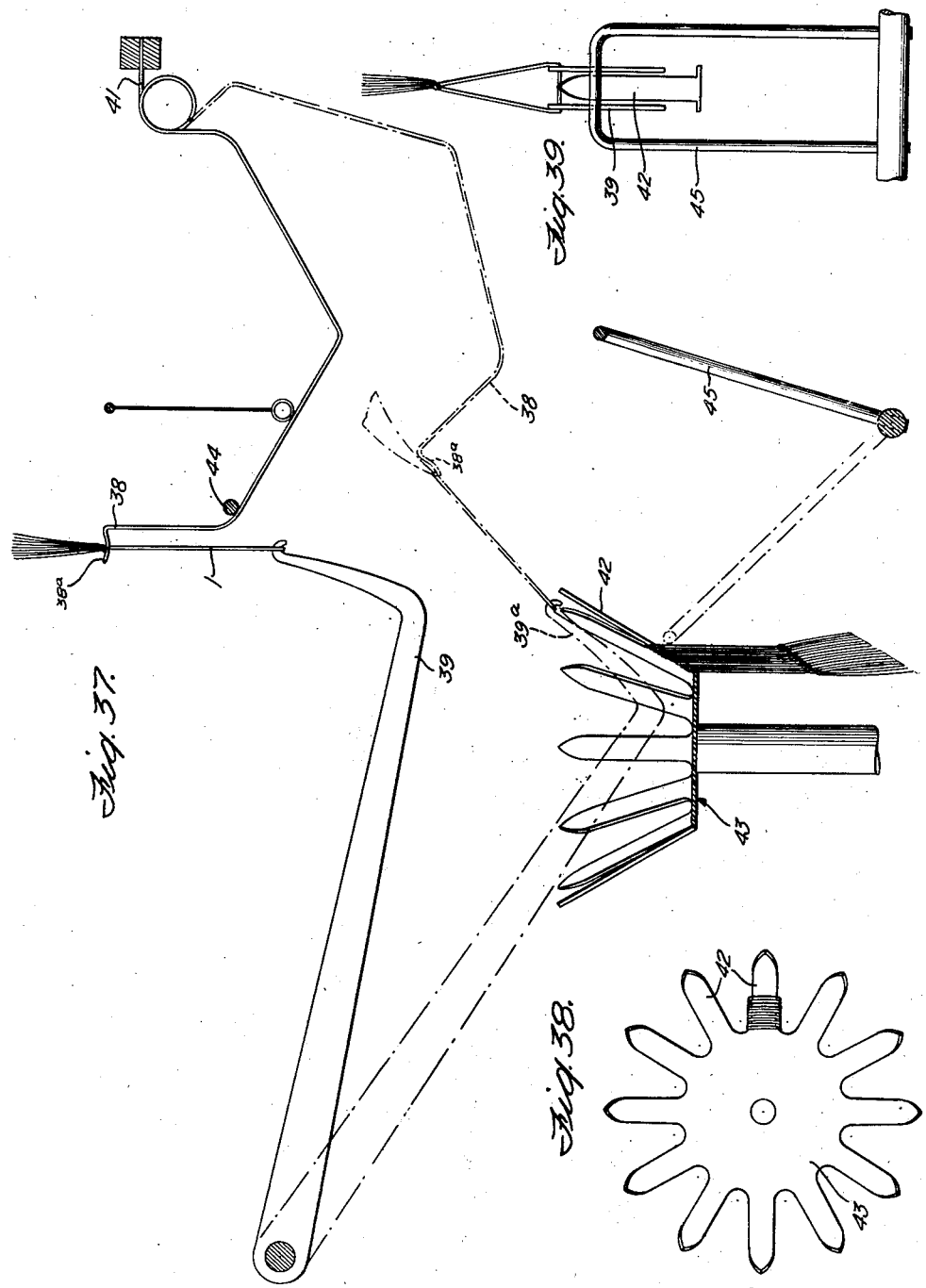

Patented Sept. 5, 1939

2,171,737

UNITED STATES PATENT OFFICE 2,171,737

METHOD OF MAKING TALLY TASSELS

John G. Beaver, Brooklyn, N. Y., assignor to O. Regen Manufacturing Company, Inc., New York, N. Y., a corporation of New York Application April 2, 1935, Serial No. 14,202

25 Claims. (Cl. 28—2)

This invention relates to the art of tying knots and more particularly to the art of knotting a tie cord or braid around a bundle of fibers to form a tassel. Parts of a fully organized machine are illustrated herein as utilized in carrying out the invention, but the invention claimed relates to the method and it will be understood that other means might be employed for carrying out the various manipulative steps.

As illustrated herein the invention involves measuring a bundle of thread yarn or floss yarn to be tied and holding it extended while a tie cord is brought into association with the bundle, looped about it and about a gripper, and then drawing the end of the tie cord through the loop thus formed to tie a tight knot.

The bundle of thread yarn or floss yarn above referred to may consist of the yarn in loose condition or of the yarn in interwoven or braided warp formation, as may be desired. For brevity the said bundle will hereinafter be referred to as a yarn bundle. The tie cord or braid will hereafter be referred to as a tie cord.

Other objects and advantages will hereinafter appear.

In the drawings forming a part of this specification, and illustrating parts of a preferred mechanism for carrying out the invention:

Figure 1 is a fragmentary view in sectional elevation illustrating means for measuring and cutting a tie cord and bringing the ends thereof together.

Figure 2 is a fragmentary detail view illustrating a friction device for putting tension on the tie cord.

Figure 3 is a view similar to Fig. 1 but showing the parts in another phase of the operating cycle.

Figure 4 is another view similar to Fig. 1, but showing the parts at a more advanced stage in the cycle of operations with the end of the tie brought close together.

Figure 5 is a fragmentary plan view of a guide for the upper ends of the tie cord.

Figure 6 is a view in sectional side elevation of the parts in the positions illustrated in Fig. 1, the yarn bundle and certain instrumentalities associated therewith being also shown, Figure 7 is a fragmentary detail view showing the upper free ends of the tie cord gripped together.

Figure 8 is a view in sectional side elevation showing the tie cord moved into association with the yarn bundle and certain guiding and operating instrumentalities associated therewith.

Figure 9 is a fragmentary view similar to Fig. 8 showing the parts at an intermediate stage in a step of forming a loop around the yarn bundle.

Figure 10 is a view similar to Fig. 9 showing the parts at a later stage in the cycle, Figure 11 is another similar view showing the loop fully formed and the tie cord ends ready to be moved upward toward the loop, Figure 12 is a view of the same parts illustrated in Figure 11 and at the same stage in the operating cycle, but seen from the opposite direction, Figure 13 is another view similar to Fig. 11 showing the tie cord ends as being carried into a gripper located within the loop, Figure 14 is another similar view showing the tie cord ends as fixed in the gripper and being drawn through the loop, Figure 15 shows the tie cord ends as having been drawn through the loop.

Figure 16 shows the ends of the tie cord as having been drawn down against a support to tighten the knot, Figure 17 is a fragmentary sectional elevation illustrating mechanism for supplying a multiplicity of yarns for the knot tying operation, Figure 18 is a view similar to Fig. 17 but showing a length of the strands drawn out into position for the knot tying operation, Figure 19 is a fragmentary sectional elevation showing the parts in positions corresponding to the showing of Fig. 10, Figure 20 is a fragmentary detail view showing the parts in positions corresponding to Fig. 11, Figure 21 is a fragmentary sectional plan view illustrating the parts at the stage of the cycle illustrated in Fig. 4, Figure 22 is a view similar to Fig. 21 showing the parts at the same stage of operations illustrated in Figs. 8 and 18, Figure 23 is a plan view showing the parts in the positions of Figs. 10 and 19, Figure 24 is a sectional plan view showing the parts at the same stage as that illustrated in Figs. 11 and 20, Figures 25, 26 and 27 illustrate the parts, respectively, in the positions of Figs. 13, 14 and 16, Figure 28 is a view similar to Fig. 27 and shows the operation at a stage a little subsequent to that illustrated in Fig. 27, Figure 29 is a detail sectional view illustrating the form of the grippers employed for forming the loop of the tie cord about the fiber bundle, Figure 30 is a fragmentary view in side elevation illustrating the right hand gripper of the pair shown in Fig. 29, Figure 31 is a fragmentary view in elevation showing the tie cord as being pulled down to tighten the knot, Figure 32 shows the tie cord as having been drawn through the knot tightening jaws, Figure 33 is a view in sectional end elevation of the knot tightening jaws as the pulling through of the knot commences, Figure 34 is a view similar to Fig. 33 but showing the knot as being drawn between the tightening jaws, Figure 35 is a view illustrating the tassel and tie cord as finally associated, Figure 36 illustrates a booklet such as a dance program or bridge score card with the tie cord attached to it, Figure 37 is a fragmentary view in sectional elevation illustrating how the tie cord loops are deposited about supporting arms of a collecting magazine, Figure 38 is a plan view of the collecting magazine, and Figure 39 is a view in end elevation of a portion of the structure illustrated in Fig. 37.

The tie cord 1 (see Fig. 1) is furnished from a spool or reel (not shown) and is drawn through a friction retarder 2 to hold it under tension. The friction retarder comprises a block 3 having a slot 4 formed therein. A slide 5 of U-form includes an arm 6 which operates in the slot 4 and bears against the tie cord 1 to frictionally oppose feeding of the same. The opposite arm 7 of the member 5 is provided with a slot 8 which rides upon the shank of a screw 9, the arm 7 being held against the face of the block 3 by the head of the screw 9. The intermediate body portion 10 of the U-shaped member 5 is impaled upon a guide pin 11 carried by the block 3. A tension spring 12 is connected to pins 13 and 14 mounted respectively upon the U-shaped member 5 and upon the block 3 for drawing the U-shaped member toward the base of the slot 4.

The parts are illustrated in Fig. 1 in the positions occupied by them at the beginning of a cycle of operations. The leading end of the tie cord 1 is positioned between grippers 15 and 16 which are carried by an arm 17 mounted on a rock shaft 18. At the beginning of the cycle the grippers 15 and 16 close upon the end of the cord and the arm 17 then swings counter-clockwise to the dotted line position indicated by 17a. This carries the cord in an arcuate path beneath a pair of hooks 19, and since the friction device 2 opposes the feeding forward of the cord, the cord is drawn taut beneath the hooks as illustrated in Fig. 3. Arms 20 and 21, swingable about centers 22 and 23, respectively, carry pairs of grippers 24 and 25. When the parts are in the positions of Fig. 3 the grippers 24 and 25 close upon the draw cord. Cooperating blades 26 and 27 then move across the cord and cooperate with one another to sever the cord, the cord ends protruding beyond the grippers being of substantially the same length.

The arms 20 and 21 then swing upward so that the grippers 24 and 25 carry the ends of the cord upward and into the slots 28 of a guide 29 shown in Figs. 4 and 5. Gripper jaws 30 and 31 then close in upon the cord ends and grip them together as shown in Fig. 7. At this point the parts are substantially in the dot and dash line positions indicated by 19a, 30a and 1a in Fig. 8.

The tie cord is then moved bodily to the right by movement of the grippers 30 and 31 to the full line position of Fig. 8, movement of the hooks 19 to the full line position of said figure, and movement of a yoke 32 from the dot and dash line position 32a of Fig. 8 to the full line position thereof. This movement carries the tie cord over against a thread bundle 33 which is to be tied, and against a pair of grippers 34, 35. It also carries the tie cord between the flaring jaws of loop tightening grippers 36 and 37, which latter grippers come into play at a subsequent stage in the cycle of operations.

The tie cord is also carried into a position such that the end 38a of a depressible spring arm 38 extends into the loop formed by the cord. At this time the cord is in juxtaposition to hooks 39 which replace the hooks 19, permitting them to return at once to their original positions for the carrying out of the preliminary steps of a succeeding cycle.

The grippers 30, 31 carry the gripped ends of the tie cord around the thread bundle 33 and around the grippers 34, 35, as shown step by step in Figs. 8, 9, 10, 11, 12 and 13.

As the tie cord ends near the position illustrated in Fig. 13 the grippers 34, 35 are caused to open and the tie cord ends are carried between them and then gripped by them as shown in Fig. 14. The grippers 30, 31 then release the tie cord and return to perform the same operations upon the next tie cord which, in the meantime, is being measured, cut off, and looped as already described. The grippers 34, 35 draw the ends of the tie cord through the loop which has been formed, as shown in Fig. 15.

The hook 39, which has replaced the hooks 19 now swings downward, while the grippers 34, 35 retain their hold upon the tie cord ends. Thus a knot is tightly drawn about the fiber bundle 33 and after a time the tie cord ends are pulled loose from the grippers 34, 35 by the hook 39. The knot which has been formed is drawn down against the top of the knot tightening grippers 36, 37 at the upper end of a flaring passage 40 which is formed between the grippers. The continued descent of the hook 39 causes the knot to force the grippers 36, 37 slightly apart, and to pass through the flaring passage 40 (see particularly Figs. 33, 34).

When the knot has passed clear of the grippers 36 and 37 it is drawn down onto the shelf portion 38a of the depressible member 38. Further depression of the hook 39 causes the depressible member 38 to descend against the pressure of a spring 41. The hook 39, when it reaches the dot and dash line position illustrated in Fig. 37, causes the loop of the tie cord 1 to pass around an upstanding arm 42 of a revoluble magazine 43. At the same time depressible member 38 having reached the dot and dash line position 38b shown in Fig. 37 can no longer retain the knot upon it. The tie cord and tassel are, therefore, drawn free of the shelf portion of member 38 so that the finished tassel and cord are hung on one of the arms 42 of the magazine 43 and the depressible member 38 is permitted to return to the full line position illustrated in Fig. 37, being arrested in that position by a stop 44. A yoke like member 45 is swung counter-clockwise after one of the tassel and draw cord assemblies has been deposited on a magazine arm, to press the same in a direction to make sure that it is caused to travel along the arm as far as possible toward the base thereof.

The finished tassel and tie cord combination may be used on a bridge score card or dance program 45 in the well known manner illustrated in Fig. 36. The loop of the tie cord is first passed through a perforation in the score card and the tassel is then passed through the loop of the tie cord.

The yarn or strands for forming the yarn bundle 33 are preferably supplied to the machine in parallel relation being caused to pass through a common guide opening 46 in a stationary guide member 47. The strands then pass through a guide opening 48 in a movable measuring bar 49 and then through a guide opening 50 in a stationary guide member 51. At the beginning of the cycle of operations the parts are in the position illustrated in Fig. 17. The lower ends of the strands are passed around the guide member 52 and through a friction retarder 53 which is like the friction retarder 2 in Fig. 1. An upper gripper 54 and lower grippers 55 close in and seize the ends of the strands and are then swung clockwise by an arm 56 upon which they are mounted. The arm 56 is fixed upon a rock shaft 57. As the yarn strands are drawn forward to the position of Fig. 18 measuring bar 49 yields and is displaced to the full line position illustrated in Fig. 18. While the yarn strands are held extended the measuring bar returns to its original position to measure a new length as indicated in dot and dash lines in Fig. 18.

The knot tying operations are performed as already described, and at the conclusion of these operations, substantially simultaneously with the beginning of the downward pull of the hook 39, cutter blades 58 and 59 are operated to sever the strands, and the grippers 54, 55 are opened to release the strands. The arm 56 is then swung back to its original position as indicated in Fig. 17, ready for the beginning of a new cycle of operations.

I have described what I believe to be the best embodiments of my invention. I do not, however, wish to be confined to the embodiments shown, but what I desire to cover by Letters Patent is set forth in the appended claims.

I claim:

1. The method of making tassels which comprises simultaneously drawing out a multiplicity of yarn strands to provide a yarn bundle of predetermined length, providing a tie cord, bringing the ends of the tie cord around the bundle to form a loop while restraining the intermediate portion of the tie cord, drawing the ends of the tie cord through the loop to form a knot in the tie cord with the bundle extending through a loop in the knot, and pulling upon the intermediate portion of the tie cord to tighten the knot, and deforming the interknotted contiguous portions of the cord ends and of the bundle to effect a permanent disposition of the free tassel strands in continuation of the cord.

2. The method of making tassels which comprises simultaneously drawing out a multiplicity of strands of flossed yarn to form a yarn bundle of predetermined length from a supply source, holding the yarn bundle extended, providing a tie cord, looping and knotting the tie cord around the yarn bundle to form a knot in the cord with the bundle extending through a loop in the knot, and then severing the thread bundle to separate it from the supply source, and deforming the interknotted contiguous portions of the cord ends and of the bundle to effect a permanent disposition of the free tassel strands in continuation of the cord.

3. The method of making tassels which comprises drawing out and severing a tie cord of predetermined length, bringing the ends of each cord together while restraining the intermediate portion thereof, simultaneously drawing out a multiplicity of yarn threads in parallel relation from a supply source to form a yarn bundle, holding the bundle extended, tying the tie cord around the bundle to form a knot in the tie cord with the bundle extending through a loop in the knot, and severing the bundle to separate it from the supply source, and deforming the interknotted contiguous portions of the cord ends and of the bundle to effect a permanent disposition of the free tassel strands in continuation of the cord.

4. The method of making tassels which comprises drawing out and severing a tie cord of predetermined length, bringing the ends of each cord together while restraining the intermediate portion thereof, simultaneously drawing out a multiplicity of yarn threads from a supply source to form a bundle, holding the bundle extended, tying the tie cord around the bundle, severing the bundle to separate it from the supply source, and pulling the cord while restraining the knot to tighten the knot.

5. The method of making tassels which comprises drawing out and severing a tie cord of predetermined length, bringing the ends of each cord together while restraining the intermediate portion thereof, simultaneously drawing out a multiplicity of yarn threads from a supply source to form a yarn bundle, holding the bundle extended, tying the tie cord around the bundle, severing the bundle to separate it from the supply source, pulling the cord while restraining the knot to tighten the knot, and then hanging the tie cord on a support.

6. The method of making tassels which comprises drawing out and measuring a length of tie cord, gripping the tie cord adjacent one end and at a point substantially separated therefrom, cutting the tie cord to provide end portions of substantially equal lengths beyond the gripped points, restraining the intermediate portion of the cut tie cord, swinging the ends thereof into juxtaposed relation, gripping the ends together, forming a bundle of tassel strand components, and, while still restraining the intermediate portion of the tie cord and interknotting the cord ends with the bundle of tassel strand components, at a region of the bundle intermediate its ends.

7. The method of making tassels which comprises gripping the end portion of a tie cord, moving said end portion over a yarn floss bundle to form a loop and to position the end portion of the cord in line with the loop, re-gripping the end portion of the tie cord, releasing the first grip and pulling the end portion through the loop to form a knot, in the tie cord with the bundle extending through a loop in the knot.

8. In the continuous method of making tassels from a multiplicity of yarn strands of indefinite individual length, the steps which comprise leading the strands simultaneously into juxtaposition, gripping the leading ends of the juxtaposed strands, forming a loop in the juxtaposed strands while they are so gripped, cutting off a predetermined length of the yarn at the leading end of the strands, interknotting the bight of the loop with a tie cord, and then advancing the new leading end of the strands to draw a measured length of yarn to form a loop component for another tassel, and performing the tassel forming steps in succession to an indefinite extent.

9. The method as set forth in claim 8 wherein the end of a tie cord is moved around the leading portion of the yarn strands while the loop is being formed and prior to the severance of such leading portion.

10. The method as set forth in claim 8 wherein the gripped leading portion of the strands is held straight while the end of a tie cord is moved around it.

11. The method as set forth in claim 8 wherein a tie cord is measured and cut and another previously measured and cut tie cord is simultaneously tied about the leading end of the yarn strands.

12. The method of making tassels which comprises measuring and cutting a tie cord, measuring and drawing forward a group of associated yarn strands of originally indefinite individual extent and holding them straight, moving the tie cord into association with the straight portion of the yarn strands, tying the tie cord about the yarn strands to form a knot, in the tie cord with the bundles extending through a loop in the knot, and then severing the tied yarn strands.

13. In a machine for making tassels, in combination, means for simultaneously drawing out a multiplicity of yarn strands to form a yarn bundle of predetermined length, means for feeding a tie cord into association with the yarn bundle, means for carrying the ends of the tie cord around the bundle to form a loop, means for restraining the intermediate portion of the tie cord during the formation of the loop, and means for drawing the ends of the tie cord through the loop to interknot the tie cord with the bundle extending through a loop in the knot, the tie cord restraining means serving also to pull upon the intermediate portion of the tie cord to tighten the knot after the knot has been formed.

14. In a machine for making tassels, in combination, means for simultaneously drawing out a multiplicity of strands of flossed yarn to form a yarn bundle of predetermined length from a supply source and for then holding the yarn bundle extended, means for feeding a tie cord into association with the yarn bundle, means for looping and knotting the tie cord around the yarn bundle to interknot the tie cord with a medial portion of the bundle extending through a loop in the knot, and means for then severing the thread bundle to separate it from the supply source.

15. In a machine for making tassels, in combination, means for drawing out and severing a tie cord of predetermined length, means for bringing the ends of the tie cord together, means for restraining the intermediate portion of the tie cord as the ends are brought together, means for simultaneously drawing out a multiplicity of yarn threads in parallel relation from a supply source to form a bundle and for holding the bundle extended, means for interknotting the cord with a bight in the bundle, and means for thereafter severing the bundle to separate it from the supply source.

16. In a machine for making tassels, in combination, means for drawing out and severing a tie cord of predetermined length, means for bringing the ends of the tie cord together, means for restraining the intermediate portion of the tie cord as the ends are brought together, means for simultaneously drawing out a multiplicity of yarn threads from a supply source to form a bundle and for holding the bundle extended, means for tying the cord around the bundle, means for severing the bundle to separate it from the supply source, means providing a restricted opening around the tie cord, and means for pulling upon the tie cord to pull the knot and the tied bundle through the restricted opening.

17. In a machine for making tassels, in combination, means for drawing out and severing a tie cord of predetermined length, means for bringing the ends of the cord together while restraining the intermediate portion thereof, means for simultaneously drawing out an end of the yarn thread from a supply source to form a yarn bundle and for holding the bundle extended, means for tying the cord around the bundle, means for severing the bundle to separate it from the supply source, means providing a restricted opening through which the tie cord passes, means for pulling tie cord to draw the knot and the tied bundle through the restricted opening, and an upstanding arm extending into position to receive the loop of the pulled tie cord.

18. In a machine for making tassels, in combination, means for drawing out and measuring a length of tie cord, means for gripping the tie cord adjacent an end and at a point substantially separated therefrom, means for cutting the tie cord to provide end portions of substantially equal lengths, beyond the gripped points, means for restraining an intermediate portion of the tie cord, means for swinging the ends of the cut cord into juxtaposed relation, means for gripping the ends together, and means for interknotting said ends with a bight of the bundle.

19. In a machine for making tassels, in combination, means for gripping the end portions of a tie cord, means for moving the end portion over a yarn floss bundle to form a loop and to position the end portion of the yarn in line with the loop, means for regripping the end portion of tie cord prior to release of the tie cord by the first gripping means, and means for causing the regripping means to pull the end portion through the loop to form a knot in the tie cord with the bundle extending through a loop in the knot, and thereby to interknot a bight of the bundle with contiguous ends of the tie cord.

20. In a machine for making tassels, in combination, means for leading a multiplicity of yarn strands into juxtaposition, means for gripping a leading end portion of the juxtaposed strands, means for forming a loop in the juxtaposed strands while they are so gripped, means for interknotting a tie-cord with a part of said loop, means for cutting off a predetermined length of yarn at the leading end of the strands, and means for then advancing the new leading end of the strands to draw a measured length of yarn from the loop.

21. A machine as set forth in claim 20, wherein provision is made of means to move a tie cord end around the leading portion of the yarn strand while the knot is being formed and prior to the severance of such leading portion.

22. A machine as set forth in claim 20, wherein provision is made of means for moving the end of a tie cord around the yarn strands while they are gripped and wherein the gripping means acts to hold the yarn strands straight during such manipulation of the tie cord.

23. A machine as set forth in claim 20, wherein provision is made of means to measure and cut a tie cord, and of means for simultaneously tying a previously measured and cut tie cord about the leading end of the yarn strands.

24. In a machine for making tassels, in combination, means for measuring and cutting a tie cord, means for measuring and drawing forward a group of associated yarn strands and holding them straight, means for moving the tie cord into association with the straight portion of the yarn strands, means for interknotting the tie cord with a bight of the yarn strands, means for then severing the tied yarn strands, and means for deforming the knot to dispose the interknotted cord and yarn strands in a substantially straight arrangement.

25. The method of making a tassel as a unitary structure with the strand terminals of a looped cord, which comprises assembling the terminals of the cord with a bight formed in a bundle of tassel-component strands at a region intermediate the ends of said bundle of tassel components, interknotting said cord ends and bight, and deforming said compound knot to hold the free stretches of tassel strand components in substantially parallel extension of the cord.

JOHN G. BEAVER.